United States Patent [19]
Funada et al.

[11] 4,426,133
[45] Jan. 17, 1984

[54] TWISTED NEMATIC LIQUID CRYSTAL DISPLAY PANEL

[75] Inventors: Fumiaki Funada, Yamatokoriyama; Shigehiro Minezaki, Ikoma; Syuichi Kozaki, Nara; Hisashi Uede, Wakayama, all of Japan

[73] Assignee: Sharp Kabushiki Kaisha, Osaka, Japan

[21] Appl. No.: 219,450

[22] Filed: Dec. 23, 1980

[30] Foreign Application Priority Data

Dec. 26, 1979 [JP] Japan .................................. 54-173728

[51] Int. Cl.$^3$ .......................... G02F 1/13; G02F 1/133
[52] U.S. Cl. ...................................... 350/334; 350/337
[58] Field of Search ................... 350/334, 337, 339 R, 350/340–341, 352; 368/242

[56] References Cited

U.S. PATENT DOCUMENTS 3,947,185 3/1976 Maezawa ............................ 350/334
4,039,252 8/1977 Mizuno et al. ...................... 350/341

OTHER PUBLICATIONS

Boscianski, M., "Optical Characteristics of Twisted Nematic Liquid Crystals: Application to the Improvement of the Scanning Capability in Matrix Displays", Jr. App. Phys., 4-1977, pp. 1426–1431.
McIntyre, P., "Transmission of Light Through a Twisted Nematic Liquid Crystal Layer", Jr. Opt. Soc. Am., 6-1978, pp. 869–872.
Grinberg et al., "Transmission Characteristics of a Twisted Nematic Liquid-Crystal Layer", Jr. Opt. Soc. Am., 10-1976, pp. 1003–1009.

Primary Examiner—William H. Punter
Attorney, Agent, or Firm—Birch, Stewart, Kolasch & Birch

[57] ABSTRACT

A twisted nematic liquid crystal is characterized in that the direction of longitudinal axes of liquid crystal molecules adjacent each of a pair of polarizers is deviated with respect to the orientation vector of each of the polarizers in order to improve display contrast ratio.

9 Claims, 5 Drawing Figures

TWISTED NEMATIC LIQUID CRYSTAL DISPLAY PANEL

BACKGROUND OF THE INVENTION

The present invention relates to a liquid crystal display cell and, more particularly, to a twisted nematic field effect mode (referred to "TN-FEM" hereinbelow) liquid crystal display panel with a high contrast display.

TN-FEM liquid crystal cells have recently found widespread commercial acceptance for applications in electronic watch faces because of their excellent contrast, low voltage requirements and fast response times for such use. However, there were further problems that they showed relatively dull threshold characteristics and relatively slow response characteristics, resulting in difficulty in obtaining satisfactory contrast suitable for, e.g., multi-plex driving techniques (line scanning driving techniques) having a high segment density.

SUMMARY OF THE INVENTION

Accordingly, it is an object of the present invention to provide an improved twisted nematic field effect mode (TN-FEM) liquid crystal display panel showing a high display contrast.

It is a further object of the present invention to provide an improved TN-FEM liquid crystal display panel with an optimum orientation direction by each of a pair of linear polarizers on opposite sides of a liquid crystal layer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a twisted nematic liquid crystal is characterized in that the direction of the longitudinal axes of liquid crystal molecules adjacent each of a pair polarizers is deviated with respect to the direction of the orientation vector of each of the polarizers in order to improve display contrast ratio.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
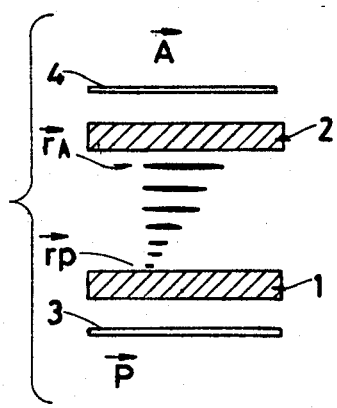
FIG. 1 shows a cross-sectional view of a TN-FEM liquid crystal display panel according to the present invention.

FIG. 1 shows a TN-FEM liquid crystal display panel comprising a pair of transparent substrates 1 and 2, pair of linear polarizers 3 and 4, and a liquid crystal layer. Electrode means formed on each of the substrates 1 and 2 is omitted for clarity of illustration. An orientation layer provided on the electrode means and the substrates is also omitted for clarity of illustration.

The polarization vectors of the polarizers 3 and 4 are defined as $\vec{P}$ and $\vec{A}$, respectively. The longitudinal axis of a molecule in the liquid crystal layer, the molecule being in contact with the substrates, is defined as $\vec{r_p}$ near $\vec{P}$ and as $\vec{r_A}$ near $\vec{A}$.

Figure 3:
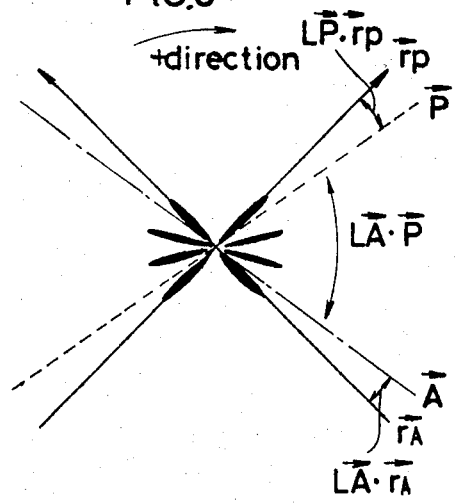
FIGS. 3 to 5 show relations among the respective orientation vectors present in the display panel of FIG. 1.

With reference to FIG. 3, the positive direction measuring angles is defined to be in the direction of helical angle in the liquid crystal layer, namely, the clockwise direction in this example. The angular relationships between each of the two polarization vectors and each of the longitudinal axes are set as follows:

(1) an angle of $\vec{P}$ with respect to $\vec{r_p}$ (referred to as $<\vec{P}\,\vec{r_p}$ in FIG. 3): about 3° to about 8° inclusive (2) an angle of $\vec{A}$ with respect to $\vec{r_A}$ ($<\vec{A}\,\vec{r_A}$): about −8° inclusive (3) an angle of $\vec{A}$ with respect to $\vec{P}$ ($<\vec{A}\,\vec{P}$): about 7 to about 84° inclusive The above condition is directed to a display which visible using extraordinary rays for the liquid crystal molecules (rays parallel to the axes of the liquid crystal molecules) in the case of double refraction.

Figure 4:
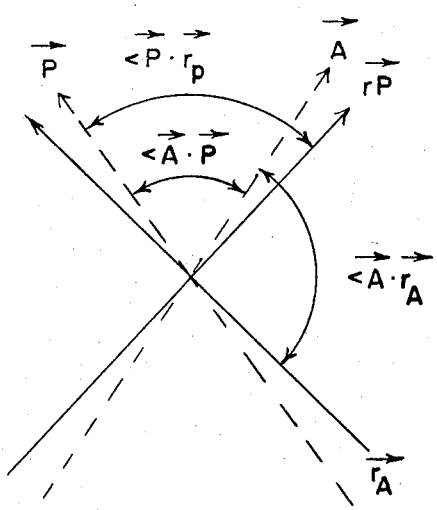
Figure 5:
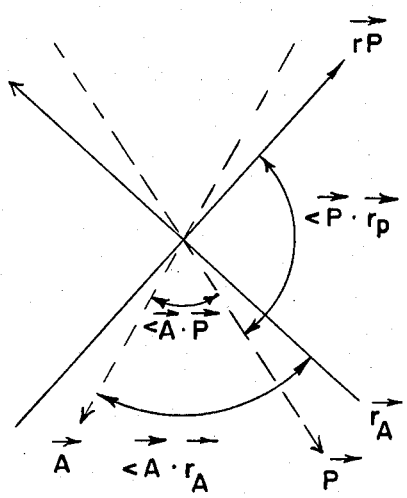

For ordinary rays (rays parallel to the short axes of the liquid crystal molecules), it is necessary to deviate the above angle conditions by −90° or 90° as shown in FIGS. 4 and 5, respectively.

Specifically, FIG. 4 illustrates the positions of the above-noted vectors with the positions of vectors $\vec{A}$ and $\vec{P}$ rotated −90° degrees. In this arrangement, the angle $\vec{A}\,\vec{P}$ is substantially 74–84 degrees, the angle $\vec{Pr_p}$ is substantially −82 degrees to −87 degrees, and angle $\vec{Ar_A}$ substantially −93 degrees to −98 degrees. In FIG. the vectors $\vec{A}$ and $\vec{P}$ are rotated 90 degrees in the positive direction from the positions shown in FIG. 3. this case, the angle $\vec{A}\,\vec{P}$ is substantially 74–84 degrees, the angle $\vec{Pr_p}$ is substantially 93–98 degrees, and angle $\vec{Ar_A}$ is substantially 82–87 degrees.

The reason why an angular range having an absolute value of about 3° to about 8° is selected in (1) and (2) that the effect of the present invention is not appreciated below about 3° and above about 8°. Above 8°, even if a voltage more than a threshold voltage is applied to the liquid crystal layer, a good display contrast cannot be obtained.

Figure 2:
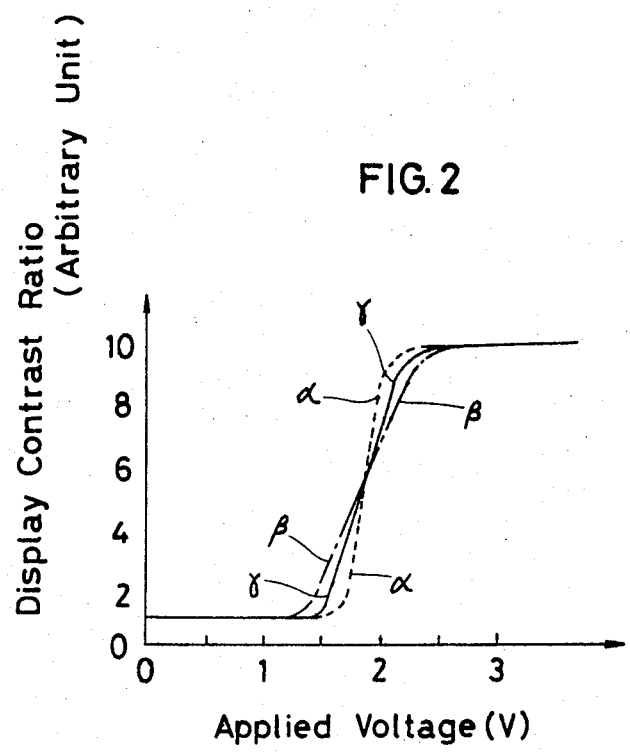
FIG. 2 is a graph representing comparison data plotted with a display contrast ratio, observed along a direction normal to the panel, as ordinate and an applied voltage as abscissa with a parameter of orientation vector by each of a pair of polarizers.

FIG. 2 shows a graph representing data comparing the present invention and conventional display panel. Data as specified by $\alpha$ are related to the present invention and data $\beta$ and $\gamma$ are related to the conventional techniques.

The respective data are obtained according to the following conditions:

(1) The $\alpha$ data is obtained under conditions satisfying the criteria (1)–(3) above:
  (i) $<\vec{P}\,\vec{r_p}$ (the angle between vectors P and $r_p$) =
  (ii) $<\vec{A}\,\vec{r_A}= -5°$
  (iii) $<\vec{A}\,\vec{P}= 80°$ (2) $\beta$ data (a conventional technique)
  (i) $<\vec{P}\,\vec{r_p}= -5°$
  (ii) $<\vec{A}\,\vec{r_A}= 5°$
  (iii) $<\vec{A}\,\vec{P}= 100°$ The β data may be obtained under condition within the following ranges:
(i) $<\vec{P}\vec{r_p}$ = about $-3°$ to about $-8°$ inclusive
(ii) $<\vec{A}\vec{r_A}$ = about $3°$ to about $8°$ inclusive
(iii) $<\vec{A}\vec{P}$ = about $96°$ to about $106°$ inclusive
(3) γ data (a conventional technique):
(i) $<\vec{P}\vec{r_p}$ = $0°$
(ii) $<\vec{A}\vec{r_A}$ = $0°$
(iii) $<\vec{A}\vec{P}$ = $90°$ The liquid crystal displays examined are as follows:
The liquid crystal mixture is a cholesteric liquid crystal material, e.g., biphenyl type liquid crystal material ROTN 403 produced by Hoffmann-La Roche Inc. containing a 0.15 weight % addition of cholesteryl nonanoate wherein the helical direction is counterclockwise and the helical pitch is as long as about 80 μm. Preferably, it is equal to or more than 40 μm. The cholesteric mixture can be replaced by a nematic liquid crystal material having a positive dielectric anisotropy.

The orientation layer is $SiO_2$ prepared by electron beam evaporation with a thickness of about 1,000 Å. The well known rubbing techniques are applied to the layer. The helical angle of the liquid crystal molecules between the two substrates 1 and 2 is set to be substantially a right angle. The thickness of the liquid crystal layer is about 7 μm. The ambient temperature is about 25° C. and there is employed a sinusoidal AC source to activate the display cell. The applied voltage is measured as an effective value (root mean square r.m.s.) (V). A photomultiplier is used to provide radiation applied to the display panel in the normal direction to the panel in order to become visible.

As can be seen from the data of FIG. 2, α data of the present invention show more excellent contrast and sharper threshold characteristics than the conventional data.

The above description is directed to the TN-FEM liquid crystal of the type containing the liquid crystal material having counterclockwise optical rotation. It can be replaced by another type of liquid crystal material having clockwise optical rotation.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A twisted nematic liquid crystal display cell comprising first and second substrates, first and second polarizers associated with the first and second substrates, respectively, a liquid crystal material between said substrates, wherein the longitudinal axes of molecules of the liquid crystal material are twisted by substantially 90 degrees between the first and the second substrates, characterized in that:
a first angle $\vec{A}\vec{P}$ is substantially 74° to 84°, a second angle $\vec{P}\vec{r_p}$ is substantially 3° to 8°, and a third angle $\vec{A}\vec{r_A}$ is substantially $-3°$ to $-8°$ wherein the positive direction of angular rotation is defined as the direction of the helical angle of the liquid crystal material, $\vec{P}$ and $\vec{A}$ are the polarization directions of the first and second polarizers, respectively, $\vec{r_p}$ is the direction of the longitudinal axes of liquid crystal molecules adjacent the first polarizer having the direction of polarization $\vec{P}$, and $\vec{r_A}$ is the direction of the longitudinal axes of liquid crystal molecules adjacent the second polarizer having the direction of polarization $\vec{A}$.

2. The display cell of claim 1, wherein the liquid crystal material is nematic liquid crystal having a positive dielectric anisotropy, or a cholesteric liquid crystal having a helical pitch of at least 40 μm.

3. The display cell of claim 1, wherein one of the first and second polarizers is a linear polarizer.

4. A twisted nematic liquid crystal display cell comprising first and second substrates, first and second polarizers associated with the first and second substrates, respectively, a liquid crystal material between said substrates, wherein the longitudinal axes of molecules of the liquid crystal material are twisted by substantially 90 degrees between the first and the second substrates, characterized in that:
a first angle $\vec{A}\vec{P}$ is substantially 74° to 84°, a second angle $\vec{P}\vec{r_p}$ is substantially 93° to 98°, and a third angle $\vec{A}\vec{r_A}$ is substantially 82° to 87°;
wherein the positive direction of angular rotation is defined as the direction of the helical angle of the liquid crystal material, $\vec{P}$ and $\vec{A}$ are the polarization directions of the first and second polarizers, respectively, $\vec{r_p}$ is the direction of the longitudinal axes of liquid crystal molecules adjacent the first polarizer having the direction of polarization $\vec{P}$, and $\vec{r_A}$ is the direction of the longitudinal axes of liquid crystal molecules adjacent the second polarizer having the direction of polarization $\vec{A}$.

5. The display cell of claim 4, wherein the liquid crystal material is nematic liquid crystal having a positive dielectric anisotropy, or a cholesteric liquid crystal having a helical pitch of at least 40 μm.

6. The display cell of claim 4, wherein one of the first and second polarizers is a linear polarizer.

7. A twisted nematic liquid crystal display cell comprising first and second substrates, first and second polarizers associated with the first and second substrates, respectively, a liquid crystal material between said substrates, wherein the longitudinal axes of molecules of the liquid crystal material are twisted by substantially 90 degrees between the first and the second substrates, characterized in that:
a first angle $\vec{A}\vec{P}$ is substantially 74° to 84°, a second angle $\vec{P}\vec{r_p}$ is substantially $-82°$ to $-87°$, and a third angle $\vec{A}\vec{r_A}$ is substantially $-93°$ to $-98°$;
wherein the positive direction of angular rotation is defined as the direction of the helical angle of the liquid crystal material, $\vec{P}$ and $\vec{A}$ are the polarization directions of the first and second polarizers, respectively, $\vec{r_p}$ is the direction of the longitudinal axes of liquid crystal molecules adjacent the first polarizer having the direction of polarization $\vec{P}$, and $\vec{r_A}$ is the direction of the longitudinal axes of liquid crystal molecules adjacent the second polarizer having the direction of polarization $\vec{A}$.

8. The display cell of claim 7, wherein the liquid crystal material is nematic liquid crystal having a positive dielectric anisotropy, or a cholesteric liquid crystal having a helical pitch of at least 40 μm.

9. The display cell of claim 7, wherein one of the first and second polarizers is a linear polarizer.

* * * * *